Dec. 2, 1947. J. J. BEAN 2,431,984
COMBINED SCREENING AND HEAVY MEDIA SEPARATION
OF PARTICLES OF WIDELY-VARYING SIZES
Filed June 1, 1945 3 Sheets-Sheet 1

INVENTOR
JAMES J. BEAN,
Elmer W. Harman
ATTORNEY

Dec. 2, 1947.  J. J. BEAN  2,431,984
COMBINED SCREENING AND HEAVY MEDIA SEPARATION
OF PARTICLES OF WIDELY-VARYING SIZES
Filed June 1, 1945  3 Sheets-Sheet 2

INVENTOR
JAMES J. BEAN,
BY
ATTORNEY

Dec. 2, 1947.  J. J. BEAN  2,431,984
COMBINED SCREENING AND HEAVY MEDIA SEPARATION
OF PARTICLES OF WIDELY-VARYING SIZES
Filed June 1, 1945  3 Sheets-Sheet 3

INVENTOR
JAMES J. BEAN,
BY
ATTORNEY

Patented Dec. 2, 1947

2,431,984

UNITED STATES PATENT OFFICE 2,431,984

COMBINED SCREENING AND HEAVY MEDIA SEPARATION OF PARTICLES OF WIDELY VARYING SIZES

James Joseph Bean, Riverside, Conn., assignor to American Cyanamid Company, New York, N. Y., a corporation of Maine Application June 1, 1945, Serial No. 596,981

5 Claims. (Cl. 209—17)

This invention relates to the separation of heterogeneous mixtures of solid particles having different densities and contemplates the provision of an improved process and apparatus for effecting such separation. More particularly, the invention relates to a novel apparatus combination used in carrying out the separation and to the method of using the same, whereby two or more solids of different specific gravities, each of which is present in widely different size ranges, may be effectively separated.

Inclusion of the large pieces in the feed to an ordinary heavy-media separation process increases operational difficulties and reduces the economic efficiency to a point at which it may become impractical. Some provision must be made for removing the sink fraction from the separatory vessel. Drags or rakes capable of removing the entire sink fraction when such large sizes are present upset the fluid flow conditions sufficiently to make separation unsatisfactory. Removing the sink fraction from the bottom of the vessel and raising it with an air-lift or the like also presents difficulties. Not only is a very large exit necessary, which makes it extremely difficult to maintain the desired fluid conditions in the vessel, but such practice requires the circulation of excessive amounts of medium, increases the pumping costs, and in the case of an air-lift, requires the use of wholly impractical amounts of air.

There remains, then a need for a process, adaptable for use either in an ordinary heavy-media separation or an improved separation such as that of the Walker process, which enables the operator to handle large pieces in the feed without being subjected to all the difficulties which have been noted. It is, therefore, the principal purpose of the present invention to develop such a process. It is further a desirable object to develop such a process which can be adapted for use with existing apparatus so that an expensive changeover will not be required. It is also a desired object of the invention to provide an apparatus for efficiently carrying out the process of this invention which can be readily installed on new operations.

In general the objects of the present invention are accomplished by a novel modification of the process and the separatory vessel used in heavy-media separation. The feed is introduced into the separatory fluid by free fall at an angle such that the particles initially tend to move through the liquid in a path having a horizontal component at least equal to its vertical component. The large pieces in the feed are arrested and removed from the vessel before being allowed to accumulate with the "sink" or "heavy" fraction at the bottom of the fluid in the chamber.

Ordinarily, the separatory chamber or vessel is smaller at the bottom than at the top, regardless of its configuration otherwise. This is done to make possible an upward flow of fluid in the lower part of the vessel while having the top of the fluid relatively quiet and also to collect the sink product at a definite location from which it can be readily removed. In most cases the vessel is shaped as an inverted cone, the sink fraction being removed at the bottom, i. e., the smallest diameter, and the float fraction overflowing at the widest diameter over a weir or some similar arrangement.

The present invention takes advantage of two facts. First, most of the separation occurs in the upper foot or so of the fluid. Second, the travel of particles as a result of their inertia, depends, after emersion, largely on their surface area and mass, due to the density and viscosity of the fluid. The larger pieces have a far smaller horizontal component of travel than do the smaller pieces, whether the sink portion or the float portion. The more dense pieces have a much greater downward movement than correspondingly-sized "light" ones since the latter, even if forced into the fluid remain at or near the surface.

According to the present invention, the feed is introduced into the top of the cone, near one side. Preferably this is done from a feed chute and the latter is placed so that the feed is free falling but enters the fluid at an angle. Provision is made near the top of the vessel for collecting and removing those pieces which are large enough to quickly lose their horizontal movement, but are dense enough to settle rapidly, without allowing such pieces to reach the bottom of the cone along with the usual size of "sink" product. Since these are the larger, heavier pieces which cause the difficulties in normal operation noted above, this prevention of their being accumulated in the sink fraction eliminates these problems.

The invention will be more fully described in connection with the accompanying drawings, in which.

Figure 1:
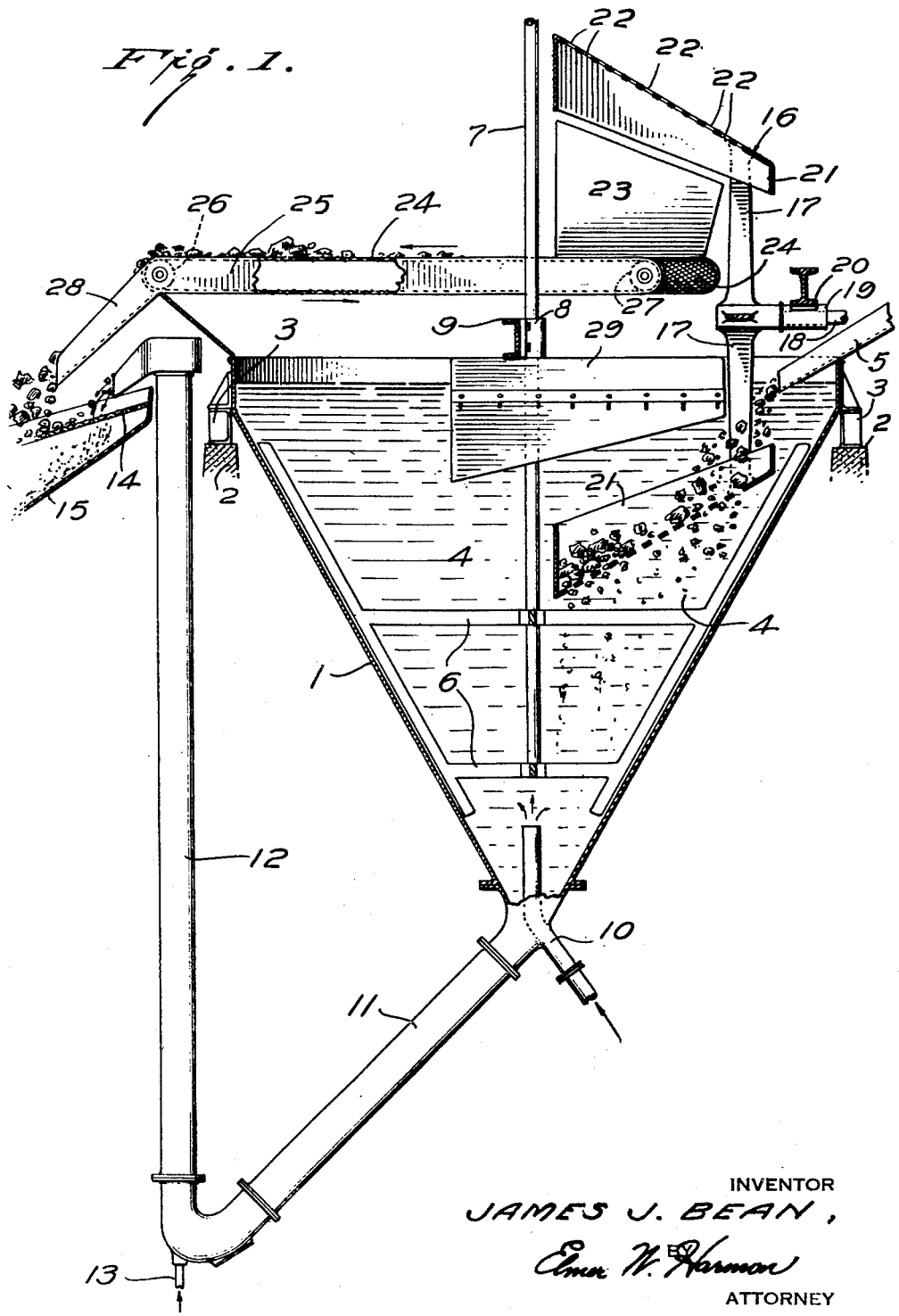
Fig. 1 is an elevation, partly in section, showing one modification of the apparatus combination.

In Fig. 1 the essential elements of the invention are quite clearly demonstrated. A conventional separatory cone 1, supported in any suitable manner, as on concrete base 2 by channel beams 3, is filled with heavy-media separatory fluid 4. The cone is provided with a chute 5 for inserting feed into top of cone 1, near one side. The cone also has the usual rakes 6, mounted on a rotatable shaft 7. Shaft 7 is supported by a bearing 8 on the beam 9 which in turn rests on top of cone 1. Shaft 8 is motivated by some conventional means which forms no part of the present invention. The apex of the cone is provided with an inlet conduit 10 for the introduction of separatory fluid. If desired, this fluid may be introduced by other means, such as a conventional downpipe but because of the apparatus mounted on top of the cone, bottom feeding may be preferable. Cone 1 is also provided with a conventional outlet conduit 11 for the removal of the "sink" or high density solids which settle to the bottom. Conduit 11 is joined in the usual manner to an upward conduit 12 which, being fitted with air inlet 13, provides an airlift which raises the sink fraction to about the height of the top of the cone. The "sink" is discharged from conduit 12 onto a conventional draining and/or washing screen 14, which in turn is provided with a drainage collector 15 and forms part of the medium recovery system, which recovery system forms no part of this invention.

So much of the apparatus of Fig. 1 is substantially conventional in form. Additional elements are introduced in accordance with the present invention. A trommel screen 16, which may be cylindrical but, as shown in Fig. 1, is preferably in the form of a truncated cone, is mounted near the top of cone 1 for rotation about its horizontal axis. The cone is supported by spider 17 on a rotating shaft 18, which may be motivated by any conventional external means. Shaft 18 is mounted in bearing 19 which in turn is supported by beam 20. Screen 16 is equipped with a plurality of lifter blades 21 and its surface is pierced by multiplicity of small openings 22. The size of these openings depends to a considerable extent on the nature of the material being treated as has been noted above.

Material settling to the inner surface of trommel screen 16 below the liquid surface is either small enough to pass through openings 22 or is carried upward by lifter blades 21 in the rotation of screen 16. Material passing through the screen openings settles to the bottom of the cone in the normal manner. That which is carried up and out by lifters 21 is discharged from the screen 16, near the top of its travel, onto baffle board 23 and/or a conveyor belt 24 running between sideplate 25 and mounted on pulleys 26 and 27, pulley 26 being rotated by some conventional external means to provide a drive for the conveyor belt. Preferably, although not necessarily, belt 24 is itself a screen as shown in Fig. 1 so that part of the fines, medium and water carried onto the belt with the coarse sink pieces can be drained directly back into the cone.

Figure 2:
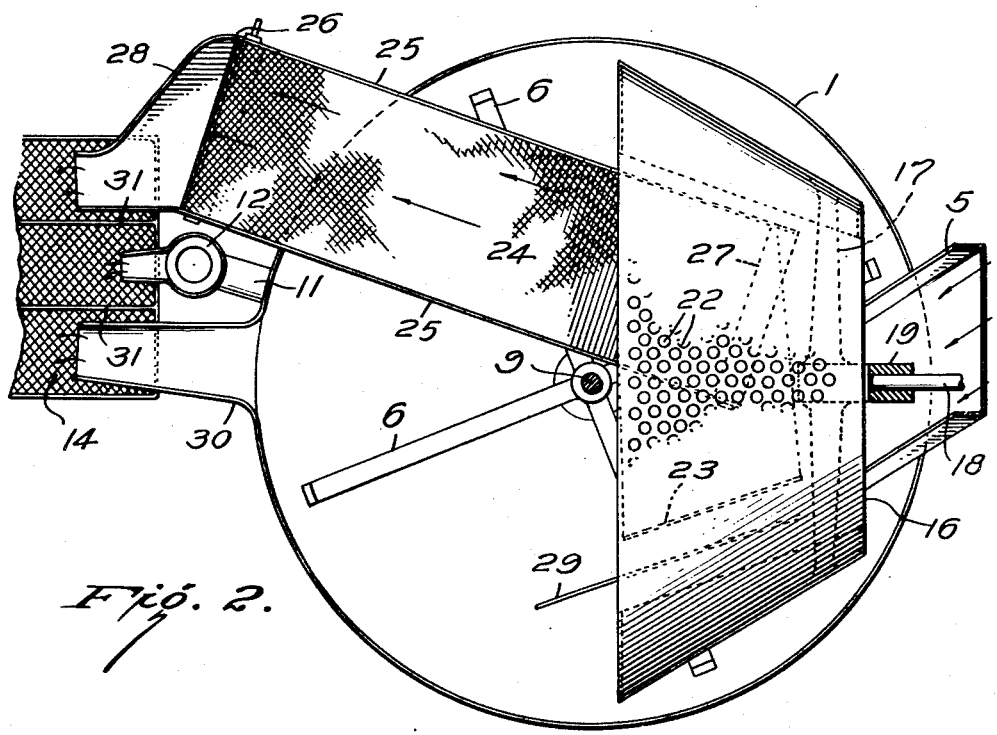
Fig. 2 is a horizontal view of the same modification.
Figure 3:
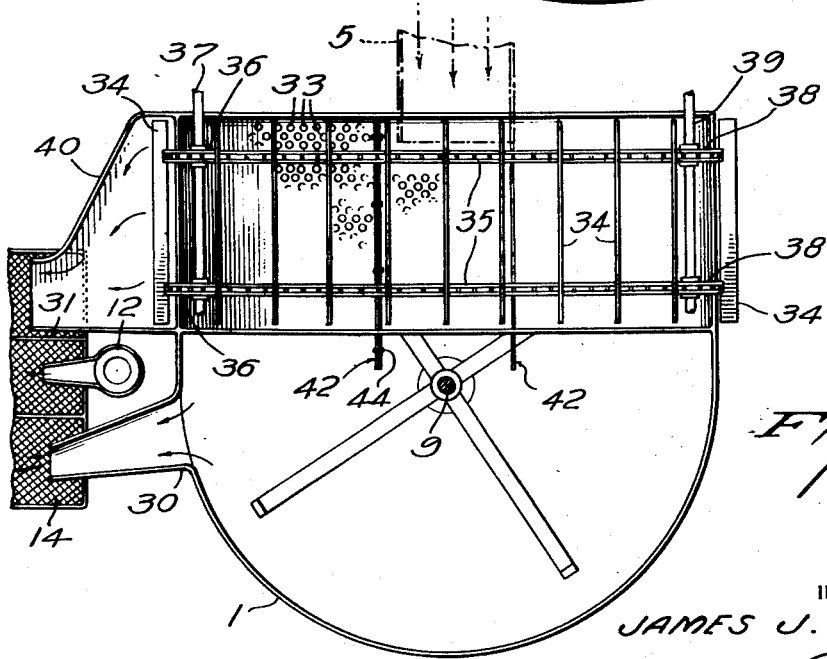
Fig. 3 is a horizontal view, partly in section, of a different modification of the apparatus.

In Fig. 1, conveyor belt 24 discharges onto a baffle plate 28 by which the material is carried down onto screen 14. The screen, however, is best seen in Fig. 2, in which screen 14 is shown as divided longitudinally into three sections by a pair of dividing walls 31. Thus the oversize sink fraction carried up and out of the system by screen 16 and belt 24 is discharged onto one section of the screen. Another section of the screen receives the smaller-size sink fraction which is carried out of the system by conduits 11 and 12. The third section receives the overflow from cone 1, which constitutes the float fraction, both large and small particles. In Figures 2 and 3 only a single screen has been shown with the products kept separate. This was done for simplicity in illustration and because the screening and medium recovery systems form no part of the present invention. It is quite apparent that separate screening systems can be established for any one or all of the different fractions removed from the cone or that two fractions may be combined on the screen without such change departing from the scope of the present invention.

Figure 4:
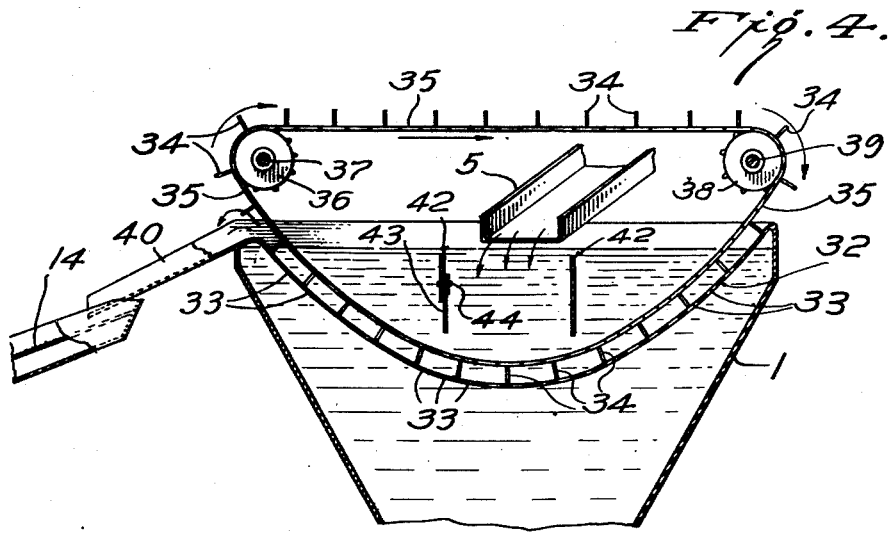
Fig. 4 is a vertical section through the top of the cone of the apparatus modification shown in Fig. 3.
Figure 5:
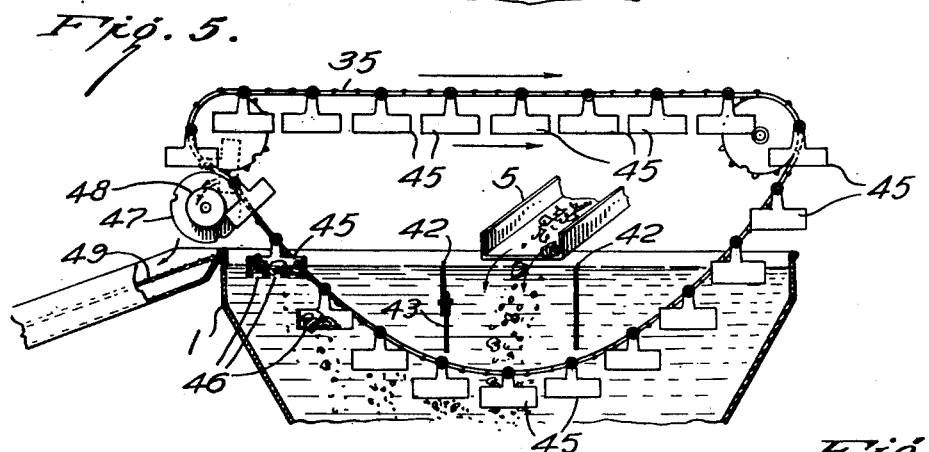
Fig. 5 is a similar view showing a somewhat different apparatus.
Figure 6:
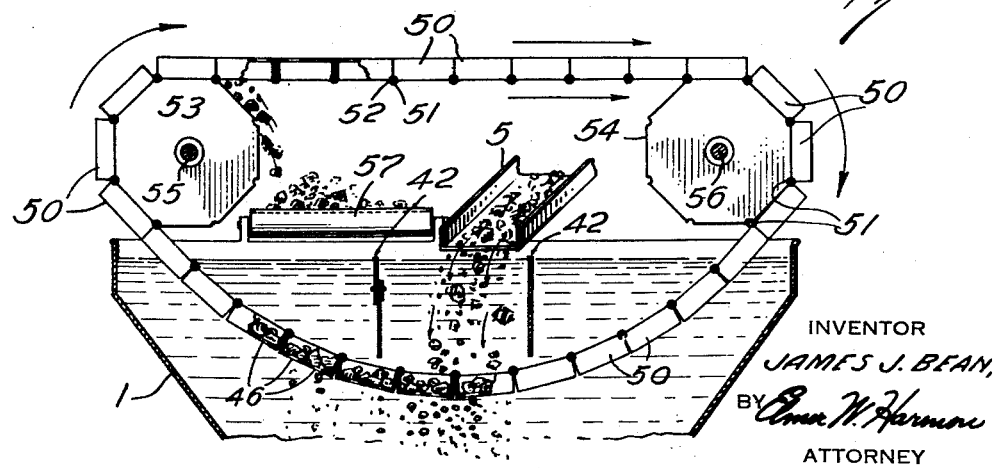
Fig. 6 is also a similar view of a still further modification.

Preferably also, the upper part of the separatory vessel is equipped with a pair of baffle plates, one plate 29 showing in Figures 1 and 2 and both plates 42 showing in Figures 4, 5 and 6. As shown in Figure 1, baffles 29 are supported from beam 9. The baffles may be parallel, but preferably are slightly divergent as they extend away from feed chute 5. By means of these baffles, material which is introduced from the feed chute and does not sink immediately is carried out of the trommel screen and the amount of such material caught by lifters 21 is thereby minimized.

In Figures 3 and 4, a modification of the apparatus is shown in which trommel screen 16 is replaced by a fixed screen 32 which is suspended from the sides of the separatory vessel and descends down into the liquid in an approximate catenary curve. Preferably screen 32 should have a uniform width and it is therefore ordinarily desirable to modify the top of cone 1, as shown in Figure 3, so that at least a part of the upper horizontal cross section has a rectangular shape. Screen 32 is, like screen 16, pierced by multiplicity of small openings 33 so that the smaller sink material will not be retained thereon. Coarse material retained on screen 32 is removed by a series of rakes 34 mounted on a pair of chains 35 which are driven by sprockets 36, which in turn are mounted on a shaft 37 driven by some conventional external means. Chains 35 carry back across the cone across feed chute 5 by means of idler sprockets 38 rotating on shaft 39, and after passing thereover, drop down into the liquid and sweep rakes 34 across screen 32. As in the case of the modification in Figure 1 the material stopped by the screen and removed from the chamber without having the opportunity to collect with the normal sink fraction at the bottom of the cone is carried across a baffle 40 onto a draining screen 14, on which the adherent fines, medium and water are removed.

The modification shown in Figures 3 and 4 is also equipped with baffles 42 by which any material which does not sink rapidly is carried across the screen and cannot settle thereon or be caught by rakes 34. As shown in Figure 4, at least the baffle toward the discharge side is preferably adjustable in depth. In order that this may be done the baffles may be made in two parts, and lower section 43, being attached to baffle 42 by a plurality of holding members such as screws or bolts 44. The lower section 43 is slotted to correspond with these bolts and is thereby capable of adjustment in clearance above the screen. Preferably, but not necessarily, lower section 43 is made of some material which is semi-flexible so that rakes 35 may be able to force any occasional extra large pieces past this baffle.

In Figure 5 a modification of the apparatus of Figures 3 and 4 is shown. Screen 32 has been eliminated and rakes 34 have been replaced by a plurality of small buckets 45, the bottom of each of which is pierced by a plurality of openings 46. Their size and arrangement are such that in the course of their travel through the fluid they form a substantially continuous screen. Buckets 45 on emerging from separatory chamber 1 are discharged by passing chains 35 over an extra pair of idler sprockets 47 which forces the leading edge of each successive bucket over a trip 48. The material therein is discharged onto a drainage screen 49.

In Figure 6 a still further modification is shown in which the chain and bucket arrangement shown in Figure 5 is replaced by a continuous arrangement of small trays 50 hinged together, at their upper edges to form a continuous belt. These, trays, like buckets 45 of Figure 5, are pierced by a plurality of small openings so that the continuous belt formed by the trays becomes not only a conveyor but a screen. The interlocking of the individual trays into the belt is by means of lugs 51 through which are passed rods 52. Lugs 51, being somewhat higher than the edge of the trays, are employed to assist in driving the belt which is suspended from and motivated by pairs of octagonal wheels 53 and 54 fixedly mounted respectively on shafts 55 and 56, which in turn are supported by some conventional means which forms no part of the present invention. Each of the edges of the octagonal wheels is grooved to receive lugs 51 and rods 52. Therefore the driving force on the belt is imparted not only by the irregular shape of the wheel but by the interlocking lugs and rods fitting in the grooves. Shaft 55, on which wheels 53 are fixed, is provided with some driving means serving to impart necessary motion to the whole set-up. Wheels 54 are simply idlers for reversing the direction of travel.

Material which is both large enough and heavy enough to settle almost vertically through the fluid will come to rest in trays 50, and any smaller material reaching the trays will pass through the openings 46 in the bottom thereof. The material retained on the trays is carried up out of the liquid around wheels 55 and discharged at the top of the travel. In falling it is caught on a conveyor belt 57 by which it is carried to a suitable draining and/or washing screen as in the modification shown in Figures 1 and 2. Also, as in the other modifications, the apparatus is provided with feed chute 5 and with baffles 42 to insure the float material being carried beyond the confines of the screen.

The procedure of the present invention is apparent from the nature of the apparatus used therein. The feed comprises the whole size range, except that in ordinary operation to simplify the recovery of the solid medium the very small fines may be removed prior to treatment, preferably by hydraulic classification, is discharged down a feed chute into the separatory vessel. The larger pieces of the heavy fraction tend to lose their initial horizontal motion and because of their greater mass drop rapidly through the separatory fluid. They quickly come to rest on a screen and are then carried upward and out of the separatory vessel without becoming mixed with the other products of the process. If so desired this coarse sink fraction may be collected separately as an individual product. Smaller sizes than this large heavy fraction, but which still have sufficient mass to settle quite rapidly, may also reach the screen. These pass through the openings therein and settle to the bottom of the cone in the conventional manner. Such sink material as does not reach the screen, settles in the cone in the usual manner.

The light fraction which tends to float presents no great difficulty. Even the larger pieces which quickly lose their momentum do not settle sufficiently to be caught by the screen, and due to the baffles and the horizontal fluid current set up by the entry of the feed and by the float overflow, quickly pass out of the range of the screen. Experience has shown that most of the separating action occurs within the first foot or so of depth of the separatory fluid, the remaining volume being necessary only to stabilize flow conditions and to provide time for settling. Therefore, if the screens in their various modifications extend down into the liquid a distance of about one to three feet or more a substantially complete separation is obtained.

It is apparent that the invention possesses a number of inherent advantages. It enables the removal of excessively large sink material before it is collected at the bottom of the cone. Excessive consumption of air to operate the airlift or the necessity for mechanical lifters is thereby eliminated. Further, because the airlift operates on a minimum air consumption the total throughput in any separatory vessel in a given time can be greatly increased.

While several modifications of the apparatus have been shown it is apparent that they can be modified without departing from the scope of the present invention. The essential elements are relatively few and simple. They consist in the separatory chamber itself with the usual provision for removing at best one float fraction and at least one sink fraction. In addition, a means is provided near the top of the vessel for arresting the fall of excessively large pieces of sink material without interfering with the normal fall of the smaller pieces. Finally, provision is made of a means for removing the arrested portion directly from the top of the cone.

I claim:

1. In a heavy-media separation process in which particles of different specific gravities and varying over a wide size range are introduced into a rising current of separatory fluid of such apparent density that the less dense fraction floats near the top thereof and is overflowed while the more lense fraction sinks therethrough: an improved method of treating a feed including very large pieces of the more dense material which comprises; introducing the entire feed into the separatory fluid by free fall at an angle such that substantially all the particles immediately after immersion tend to move in a path having a horizontal component at least equal to its vertical component; arresting, at a level slightly below the horizontal fluid zone in which the principal float fraction separation occurs but considerably above that at which the sink fraction is removed, a major portion of that fraction of the more dense material having sufficient mass to quickly assume a path having a vertical downward component greater than its horizontal component before passing out of the section of fluid comprising about the initial vertical half of the fluid; moving the so-arrested fraction upward and out of the fluid; accumulating the remaining portion of the more dense material at a lower level in the same body of fluid and removing said accumulated remaining portion from the fluid.

2. In combination, a chamber adapted to serve as a heavy-media separatory vessel; means adapted to introduce at a lower level in said chamber sufficient separatory fluid to fill and continuously overflow said chamber; overflow means adapted to remove the flowing volume of fluid; feed means, located above said chamber, adapted to introduce a mixture of discrete materials into said fluid by free fall at an acute angle with the horizontal and substantially in the direction of said overflow means; screening means in said chamber, located below the point of introduction of feed but above the level at which fluid is introduced thereinto, adapted to arrest the fall of only those particles of the more dense material having sufficient mass to settle quickly in said fluid said screening means extending horizontally across said chamber for not more than about one-half its largest horizontal dimension; means for carrying said arrested particles upwardly and out of said fluid; means located at a lower level in said fluid adapted to accumulate the remaining more dense particles which settle through said fluid and means for removing said accumulated remaining particles from said chamber.

3. An apparatus according to claim 2 characterized in that the means for arresting the fall of the more dense material of high mass comprises a trommel screen, rotating about an axis located above said chamber and parallel to the top of said fluid, said screen being of sufficient size and said axis being located at such height above said fluid that in the rotation of said screen the lower part thereof extends into the separatory fluid for a sufficient depth to arrest the fall of said larger, high-mass particles; and the means for removing said so-arrested particles comprises a plurality of lifting means fixed inside said screen whereby particles caught on the screen are carried upwardly and out of the fluid by rotation of the screen and are discharged near the top of said screen onto a conveying means located above the top of said vessel and extending for sufficient distance to remove the particles away from the top of the separatory vessel.

4. An apparatus according to claim 2 characterized in that the arresting means constitutes a fixed screen, said screen extending from one upper side of the separatory vessel downwardly along a substantially catenary curve into the separatory fluid to a low point below the point at which feed is introduced into the fluid, then up through the fluid to the opposite side of said vessel and said carrying means comprises movable means adapted to accumulate the material arrested on the screen and carry it across the screen and up out of the separatory fluid at one end of said screen.

5. An apparatus according to claim 2 characterized in that the arresting means comprises a semi-flexible screening means adapted to be moved along a substantially catenary curve extending from one side of the vessel downwardly through the fluid to a point below that at which feed is introduced into said fluid and upwardly to the opposite side of said vessel, said screening means being equipped with pockets whereby material arrested thereon is carried upwardly and out of the separatory fluid; means located above the level of fluid in said vessel for discharging particles carried in said pockets; and means for collecting said discharged material and removing it from said vessel.

JAMES JOSEPH BEAN.

REFERENCES CITED

The following references are of record in the file of this patent:

UNITED STATES PATENTS

| Number | Name | Date |
|---|---|---|
| 2,356,648 | Brusset | Aug. 22, 1944 |
| 1,392,401 | Chance | Oct. 4, 1921 |

FOREIGN PATENTS

| Number | Country | Date |
|---|---|---|
| 554,285 | Great Britain | June 28, 1943 |